United States Patent [19]
Whittier

[11] 3,846,923
[45] Nov. 12, 1974

[54] VARIABLY ADJUSTABLE DITCHING IMPLEMENT

[76] Inventor: Clyde Whittier, 5300 Ln. 7 N, Mosca, Colo. 81146

[22] Filed: May 24, 1973

[21] Appl. No.: 363,594

[52] U.S. Cl. ............ 37/98, 172/439, 172/605, 172/679, 280/405 B, 280/479 R
[51] Int. Cl. ............................................. E02f 5/02
[58] Field of Search ........ 37/98; 172/605, 439, 679, 172/254; 280/407, 405 B, 461 A, 460 A, 479 R

[56] References Cited
UNITED STATES PATENTS

| | | | |
|---|---|---|---|
| 2,625,754 | 1/1953 | Morgan | 37/98 |
| 2,982,034 | 5/1961 | Perry et al. | 37/98 |
| 2,987,837 | 6/1961 | Rasmussen et al. | 37/98 |
| 3,041,751 | 7/1962 | Chattin | 37/98 |
| 3,286,476 | 11/1966 | Maclay | 172/679 X |
| 3,750,757 | 8/1973 | Saetti | 172/439 X |

FOREIGN PATENTS OR APPLICATIONS

| | | | |
|---|---|---|---|
| 211,348 | 2/1956 | Australia | 172/439 |
| 1,095,633 | 12/1967 | Great Britain | 172/439 |

Primary Examiner—Clifford D. Crowder
Attorney, Agent, or Firm—Duane Burton

[57] ABSTRACT

A ditching implement especially adapted for the construction of irrigation ditches having flat bottoms and divergently inclined side walls. The implement includes a plow-like main frame having elongate wings diverging rearwardly from each other in a V-shaped configuration. A hitch frame for coupling the implement to a three-point tractor hitch is slidably mounted for forward and rearward movement to the main frame along the longitudinal center line of the main frame. When a hitch frame is located at its forward limit of movement relative to the main frame, the hydraulic cylinder of the three-point hitch is operable to tilt the implement into a transport position clear of the ground.

6 Claims, 9 Drawing Figures

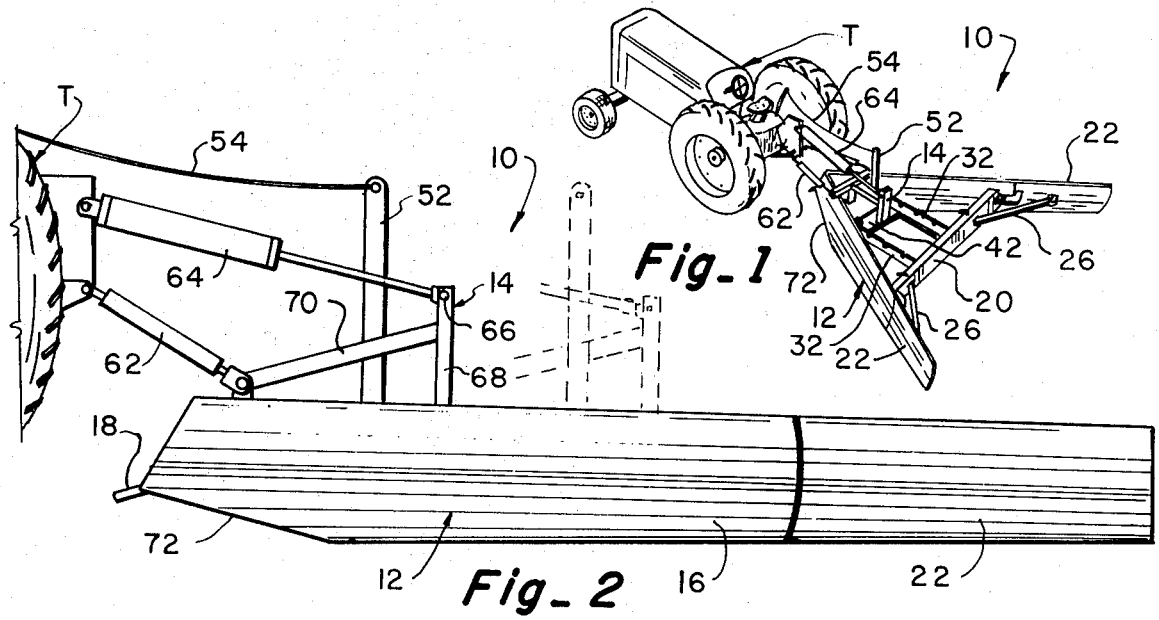
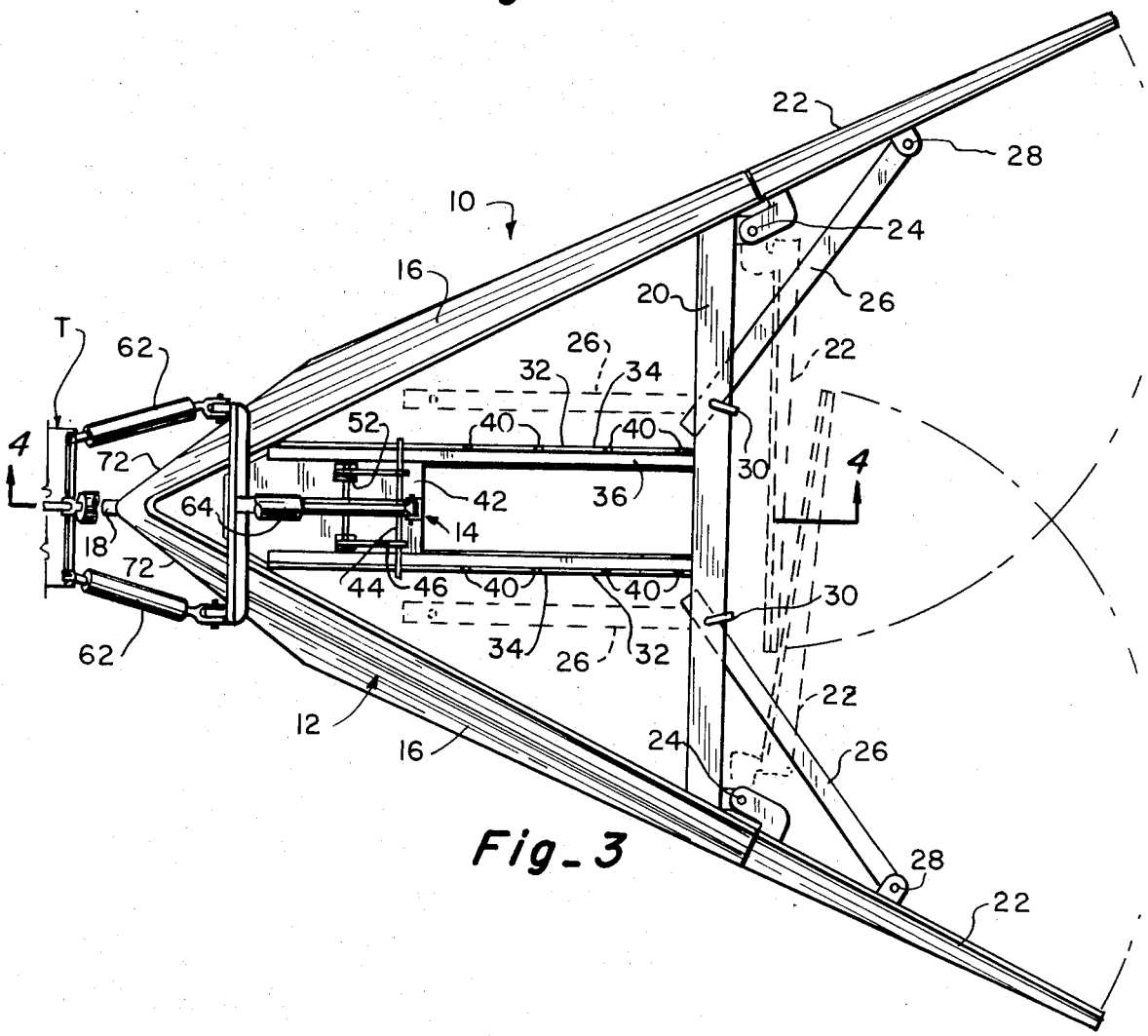

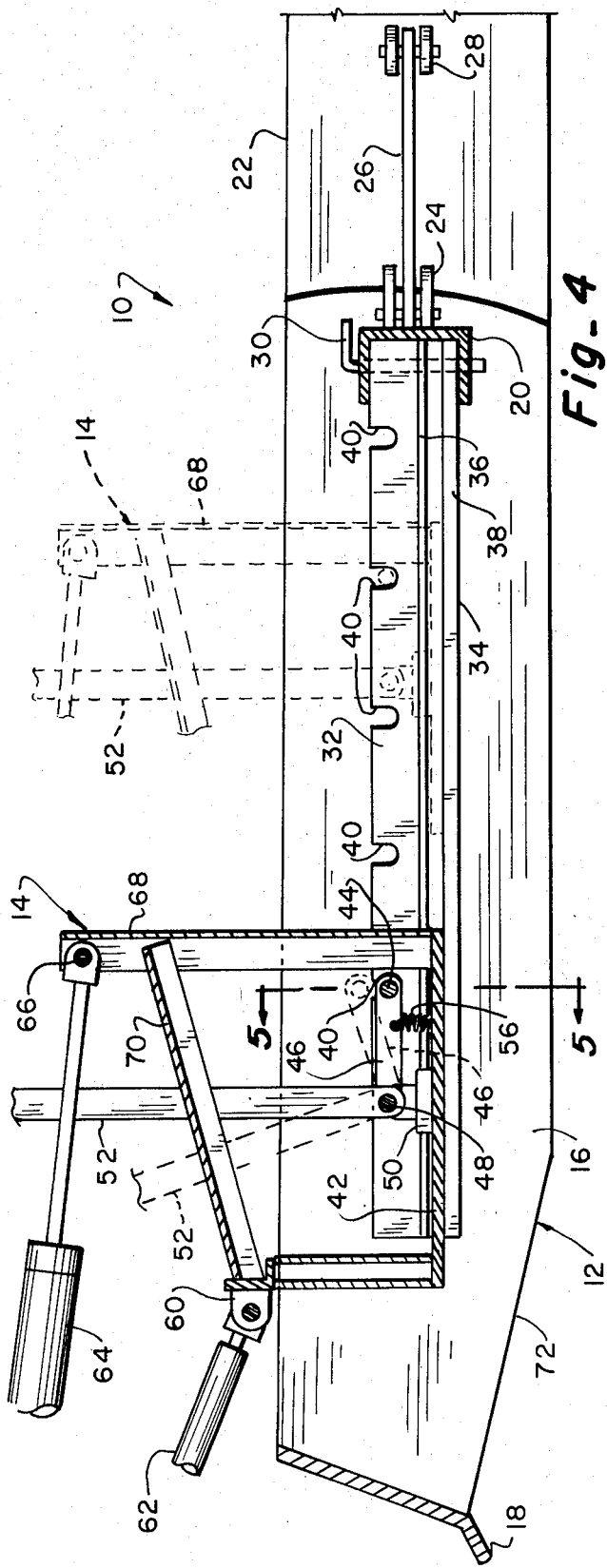
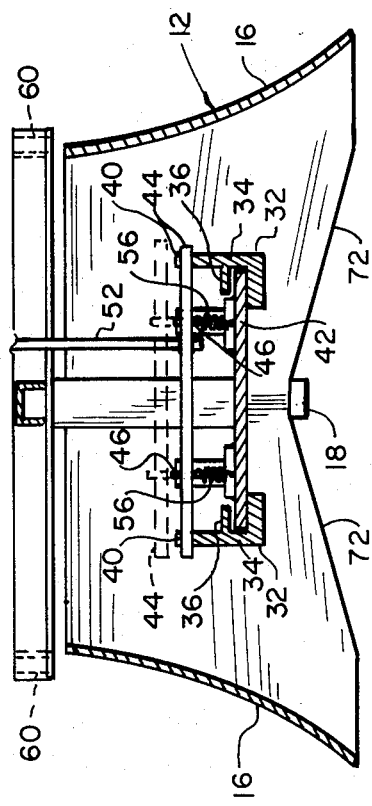

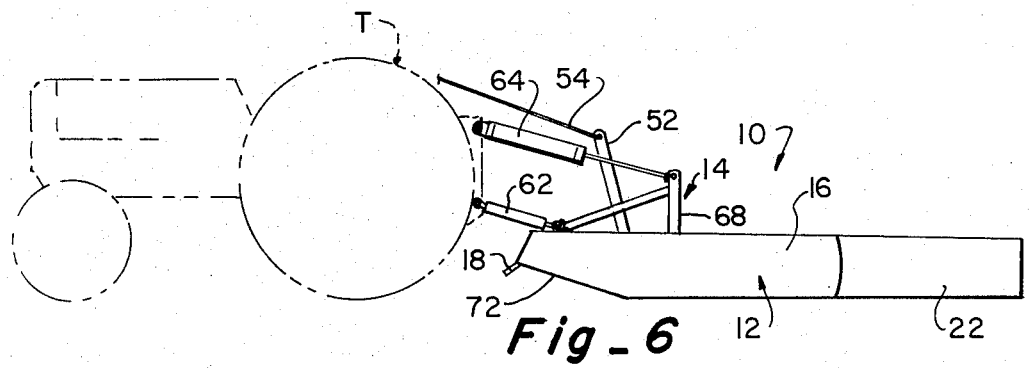
Fig_6
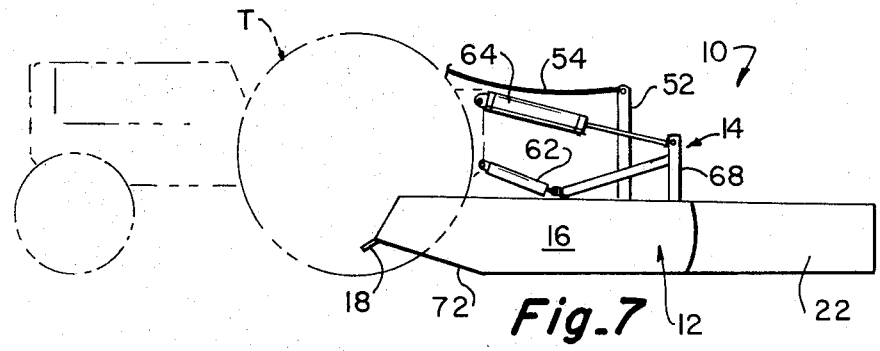
Fig_7
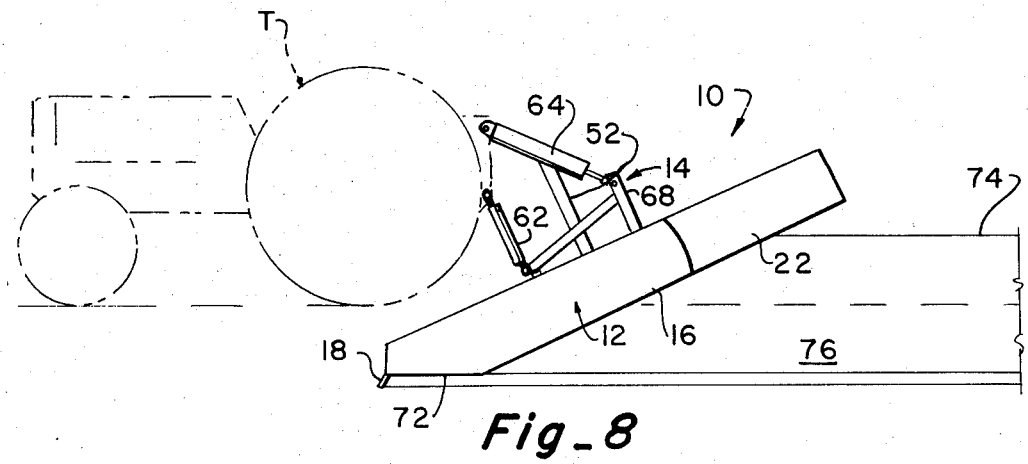
Fig_8
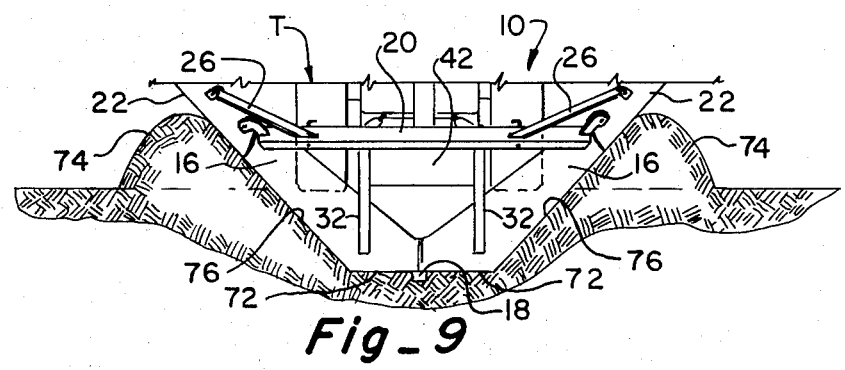
Fig_9

VARIABLY ADJUSTABLE DITCHING IMPLEMENT

BACKGROUND OF THE INVENTION

The present invention is especially designed for constructing irrigation ditches. The extensive irrigation ditch systems employed in the Western United States require a ditching implement which can efficiently and swiftly not only cut new ditches, but also repair, deepen or reform existing ditches. While several forms of tractor-drawn ditching implements are commercially available, these units are not as efficient as they might be and almost all presently available commercially available units are designed in a manner such that they require the use of a tractor larger and more powerful than those found in the majority of farming operations.

The primary object of the present invention is to provide a ditching implement which will efficiently form ditches with a relatively small power requirement.

SUMMARY OF THE INVENTION

The ditching implement of the present invention employs a hitch frame adapted to be coupled to a conventional three-point hitch which enables the ditching implement to operate in a working position in which the point of the implement is projected forward to a location underlying and between the rear wheels of the tractor. The working forces on the implement when in this advanced forward position are applied to the tractor in a manner such that the rear wheels of the tractor are forced downwardly against the ground to thereby increase the traction and more efficiently utilize the tractive force of the tractor.

The implement includes a plow-like main frame having rearwardly divergent elongate wings. The lower or cutting edge of the outwardly concave wings is formed at their forward ends with a relatively widely divergent cutting edge which is inclined upwardly relative to the remaining less divergent rearward portions of the edge. When the implement is in a forwardly inclined working position, this configuration of the cutting blades forms a ditch having a flat bottom with upwardly divergent side walls, a cross-sectional shape preferred for ditches of this type. A hitch frame is mounted on the main frame for sliding movement forwardly and rearwardly along the longitudinal center line of the main frame. A releasable locking mechanism on the hitch frame is engageable with notches on the main frame to lock the hitch frame in selected positions of longitudinal adjustment on the main frame. A coupling at the forward end of the hitch frame is employed to couple the implement to two points of a three-point tractor hitch to constitute a transverse horizontal pivot axis about which the implement may be tilted. A hydraulic cylinder couples a third point of the three-point hitch to an elevated post near the rearward end of the hitch frame so that operation of the cylinder, when the hitch frame is locked to the main frame, can tilt the implement about the horizontal axis. When the implement is rested on the ground, forward or rearward movement of the tractor with the locking means unlocked is employed to longitudinally position the hitch frame relative to the main frame. The locking means is operable by a crank which can be actuated by the tractor operator from his seat. Extended wings pivotally mounted on the rearward end of the main frame are aligned with the main portion of the wings during a working operation or may be folded inwardly along the rear of the main frame for storage or transport. The entire implement may be elevated clear of the ground to a transport position by locating the hitch frame at its forward limit of movement relative to the main frame and actuating the hydraulic motor to pivot the implement upwardly.

When in its working position, the hitch frame is located at or near its rearward end limit of movement relative to the main frame, depending upon the depth of cut desired. When in this position, the main frame is drawn forwardly relative to the tractor so that its forward end underlies the rear axle of the tractor. The blade configuration not only enables the formation of a ditch of the desired cross-sectional configuration, but the outwardly concave lower edges further perform a slicing action as the implement is drawn through the dirt.

Other features and advantages of the present invention will become apparent by reference to the following specification and the the drawings:

FIG. 1 is a perspective view showing the implement in place behind a tractor;

FIG. 2 is a side elevation of the implement;

FIG. 3 is a top plan view of the implement;

FIG. 4 is a cross-sectional view taken on the line 4—4 of FIG. 3;

FIG. 5 is a cross sectional view taken on the line 5—5 of FIG. 4;

FIG. 6 is a side view showing the implement at its rearward limit of movement relative to the tractor;

FIG. 7 is a side view showing the implement at its forward limit of movement relative to the tractor;

FIG. 8 is a side view showing the implement in its working position; and

FIG. 9 shows a cross sectional view of a ditch cut by the implement.

BRIEF DESCRIPTION OF THE DRAWINGS

Referring first to FIGS. 1–3, a ditching implement embodying the present invention is designated generally 10 and is shown coupled to a conventional three-point hitch of a tractor T as the implement would appear positioned for coupling or uncoupling. The implement includes a plow-like main frame designed generally 12 and a hitch frame designated generally 14 which is slidably mounted on the main frame for longitudinal adjustment by a structure described in greater detail below.

Main frame 12 includes a pair of rearwardly divergent wings 16 integrally joined to each other, as by welding, by a chisel point 18 at the apex of the two wings. A rigid cross bar 20 braces the rearward ends of the two wings and is rigidly secured as by welding in the position shown. Auxiliary or extension wings 22 are pivotally mounted on cross bar 20 as at pivots 24 and are shown in their extended or working positions in FIGS. 1, 2 and 3. Bracing links 26 pivotally mounted at an intermediate location along the length of auxiliary wings 22 as at 28 may be pinned to cross member 20 as by dogs 30 to hold wings 22 in their extended position. For storage or transport purposes, wings 22 can be folded inwardly upon withdrawal of dogs 30 and pinned in a collapsed position extended along the rearward side of cross member 20.

Main frame 12 further includes a pair of spaced parallel longitudinally extending track members 32 which are welded at their forward ends to wings 16 and welded at their rearward ends to cross member 20. As best seen in FIG. 5, track members 32 include a vertical web 34 and a pair of vertically spaced horizontally projecting flanges 36 and 38, the flanges 36 and 38 of the opposed track members 32 facing inwardly toward each other. A series of notches 40 are cut in the upper edges of vertical webs 34 in transverse alignment with each other.

Tracks 32 slidably support and guide hitch frame 14 in longitudinal movement relative to main frame 12, a main plate 42 of hitch frame 14 being slidably supported and retained between flanges 36 and 38 of track members 32.

A transversely extending locking bar 44 is fixedly secured to and carried by a pair of link members 46 whose opposite ends are pivotally supported as by a shaft 48 pivotally mounted in a pillow block 50 welded to plate 42. A crank arm 52 is rigidly fixed to lniks 46 and a rope 54 is led from the upper end of crank 52 to a location accessible to the operator of tractor T. A spring 56 is employed to bias links 46 downwardly toward main plate 42. Locking bar 44, when its opposite ends are seated in a pair of transversely aligned notches 40 of track members 32 is operable to lock hitch frame 14 in a selected position of longitudinal adjustment relative to main frame 12. By pulling rope 54, the operator can pivot links 46 upwardly to disengage locking bar 44 from notches 40.

A hitch link coupling member 60 is fixedly mounted, as by welding, to the forward end of main plate 42 to couple hitch frame 14 to the hitch links 62 of the tractor hitch, this coupling providing a transversely extending horizontal pivot axis about which implement 10 may be tilted by operation of a conventional hydraulic motor 64 coupled between the third point of the tractor hitch and a pivotal connection 66 at the upper end of a coupling post 68 fixedly secured to and projecting upwardly from the rearward end of main plate 42. Suitable bracing members, such as 70, may be employed to brace coupling post 68.

At the commencement of a ditch digging operation, the implement is coupled to a tractor and is positioned relative to the tractor as shown in FIG. 6 with hitch frame 14 at its extreme forward end limit of movement relative to main frame 12. The tractor operator then pulls forwardly on rope 54 to pivot crank 52 in a direction swinging links 46 and locking bar 44 upwardly against the biassing action of spring 56 to lift cross pin 44 clear of notches 40 in track members 42. Holding the rope 54 taut to maintain locking bar 44 clear of notches 40, the operator then backs the tractor up until hitch frame 14 is displaced rearwardly relative to main frame 12 a distance consistent with the depth of cut which the operator intends to make. It will be appreciated that in cutting a new ditch, soil conditions will usually be such that it is not possible to cut the ditch to full depth in a single pass and that some judgment on the part of the operator is required in setting this longitudinal adjustment. When the desired longitudinal adjustment is achieved, the operator releases rope 54, allowing cross member 44 to drop into a set of notches 40 in track members 32, thereby locking the hitch frame to main frame 12. Motor 64 is then actuated to draw in its piston rod, thereby swinging implement 10 upwardly into a forwardly inclined working position. Forward movement of the tractor causes the forward end of the implement to dig into the ground and an initial cut is made, the depth of this cut being dependent upon the firmness of the soil, the weight of implement 10, and the positioning of the piston rod of motor 64. The inclination and greater angular divergence of the forward end sections 72 of the cutting edges of wings 16 is chosen such that for any position of longitudinal adjustment of hitch frame 14 on main frame 12, the cross sectional configuration of the cut made is such that the bottom of the cut is flat while the side walls of the ditch are inclined upwardly as shown in FIG. 9 when the piston rod of cylinder 64 is fully retracted. This configuration and positional relationship finds edges 72 slicing horizontally through the soil while the outwardly concave configuration of wings 16 forces the soil upwardly and outwardly so that the excavated soil is piled along the opposite side edges of the cut as shown in FIG. 9.

The relatively advanced location of the point of implement 10, which will be located generally between the rear wheels of the tractor, exerts a substantial downward force on the tractor, thus increasing the traction.

The implement is readily transported by first shifting hitch frame 14 to its extreme forward end limit of travel relative to main frame 12 and locking the hitch frame in this position. Retraction of the piston rod of motor 64 to its extreme limit will then swing implement 10 upwardly to a transport position clear of the ground. Wings 22 are normally folded inwardly during transporting and storage operations and are extended as shown in FIGS. 1 and 2 normally only during a ditching operation.

While one embodiment of the invention has been described in detail, it will be apparent to those skilled in the art that the disclosed embodiment may be modified. Therefore, the foregoing description is to be considered exemplary rather than limiting and the true scope of the invention is that defined in the following claims.

I claim:

1. A ditch digging implement adapted to be towed by a tractor having a three-point hitch, said implement comprising a main frame having a pair of elongate wings ridigly interconnected, at their forward ends and diverging rearwardly from each other, a hitch frame mounted upon said main frame for sliding movement forwardly and rearwardly along the central longitudinal axis of said V-shaped main frame, releasable locking means for locking said hitch frame to said main frame at selected positions of longitudinal adjustment thereon, first coupling means adjacent the forward end of said hitch frame for coupling said hitch frame to two points of the three-point hitch of said tractor for pivotal movement about a horizontal axis normal to said longitudinal axis, an extensible hydraulic motor adapted to be coupled at one end to the third point of said three-point hitch, and second coupling means for coupling the other end of said motor to said hitch frame whereby said other end is movable with the hitch frame relative to the main frame, actuation of said motor means being operable to pivot said implement about said horizontal axis into a forwardly inclined position when said locking means is locked.

2. An implement as defined in claim 1 wherein said motor is operable in all positions of said hitch frame relative to said main frame to pivot said implement about said horizontal axis between a generally horizontal rest position wherein said wings rest upon the ground and a forwardly inclined position wherein the rearward end of said implement is elevated.

3. An implement as defined in claim 2 wherein said hitch frame is shiftable between a forward and a rearward end limit of movement relative to said main frame, said hydraulic motor being operable when said hitch frame is locked at said forward end limit of movement to swing said implement upwardly about said horizontal axis to a transport position clear of the ground.

4. An implement as defined in claim 3 wherein the forward end of said main frame is projected forwardly between the rear wheels of said tractor coupled to said implement when said hitch frame is located at its rearward end limit of movement relative to said main frame.

5. An implement as defined in claim 2 wherein the forward end portion of the lower edges of said wings diverge rearwardly from each other at a greater angle than the rearward end portion of the lower edges of said wings to form a ditch having a substantially flat bottom and upwardly divergent side walls.

6. An implement as defined in claim 1 wherein said hitch frame comprises plate means, opposed longitudinally extending track means on said main frame slidably receiving the opposite edges of said plate means to support and guide said hitch frame in movement relative to said main frame, and said locking means comprising crank means mounted for pivotal movement on said plate means and having an arm projecting into transverse overlying relationship with said track means, and means defining a plurality of arm receiving notches in said track means.

* * * * *